Figure 12:
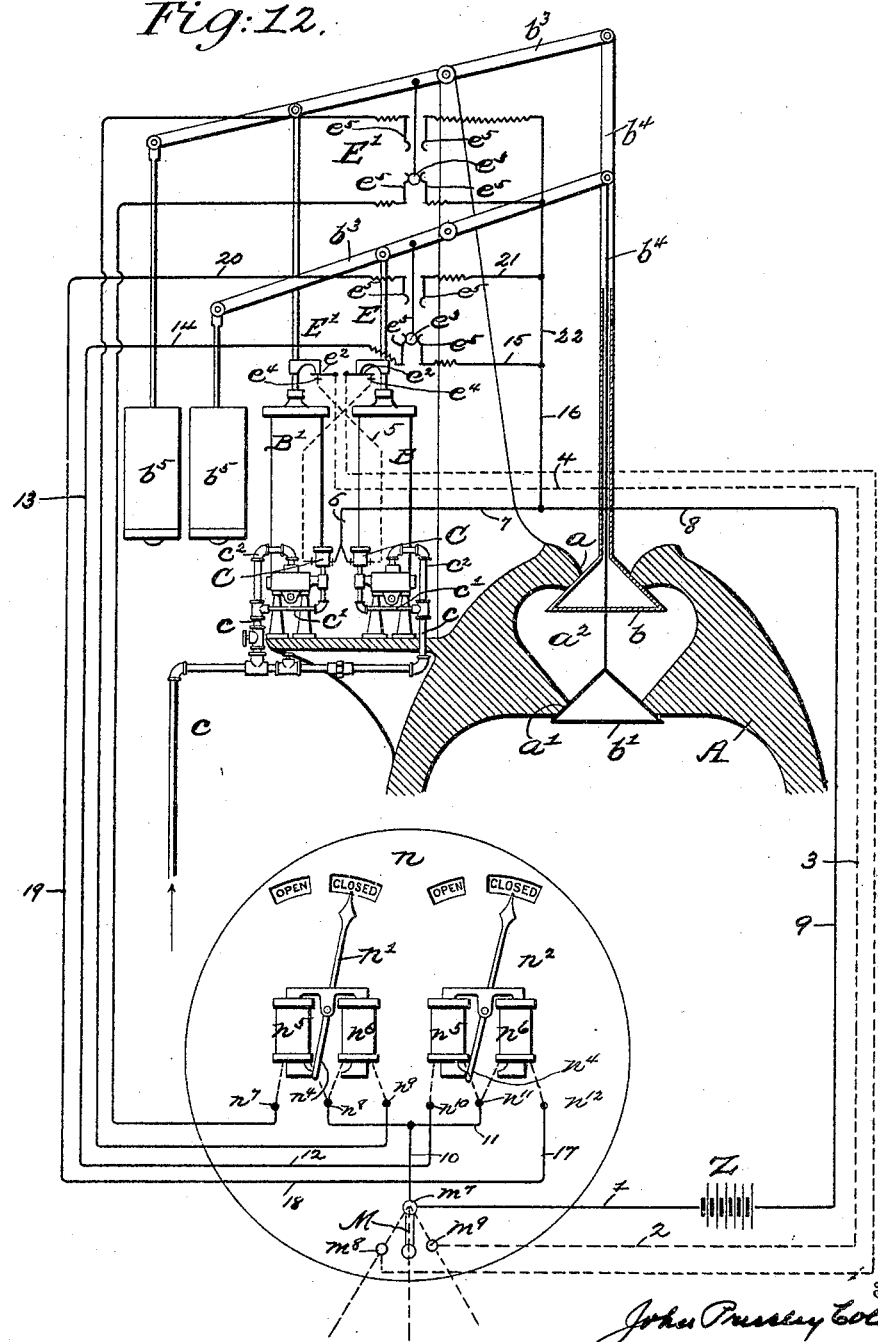

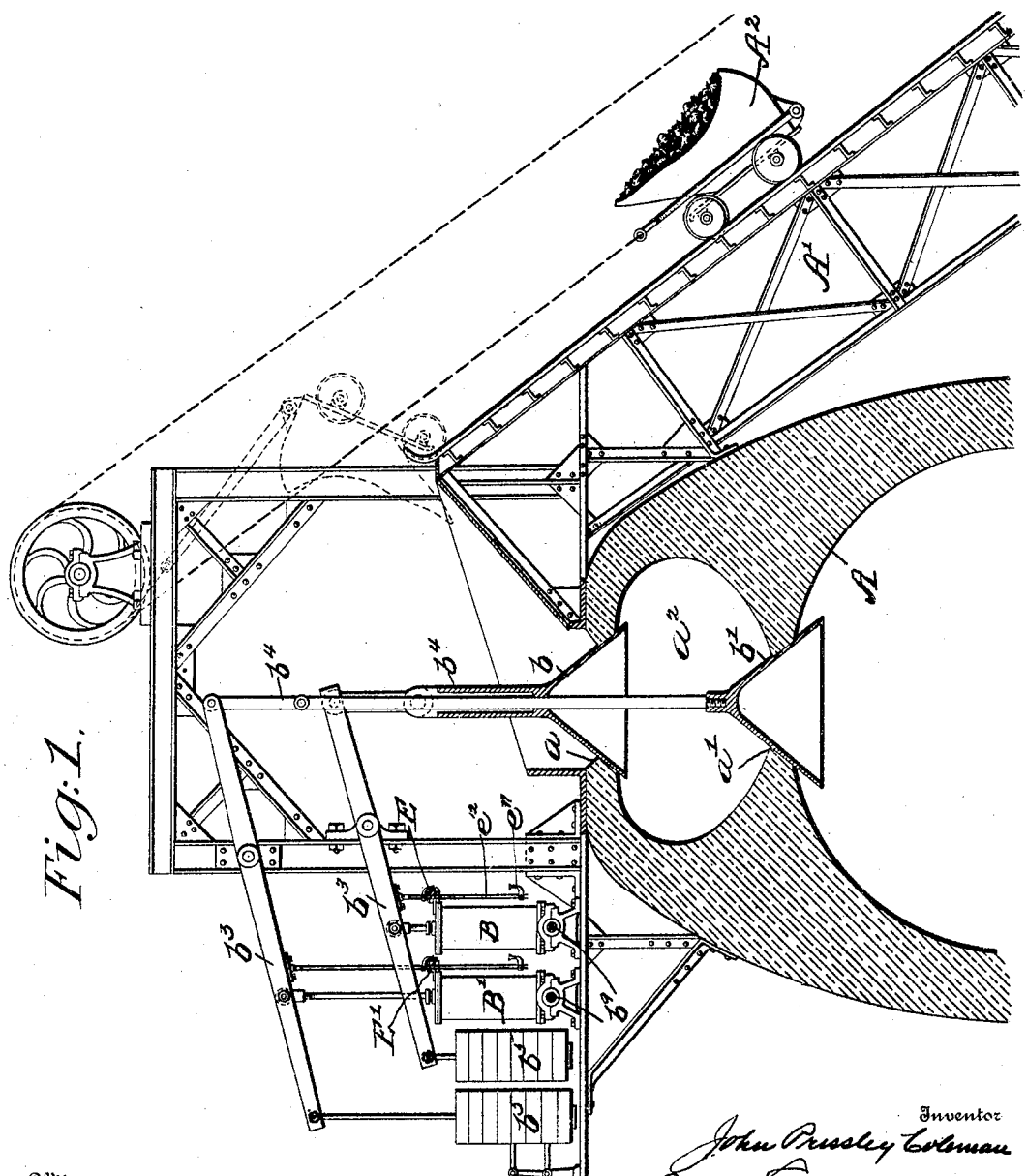

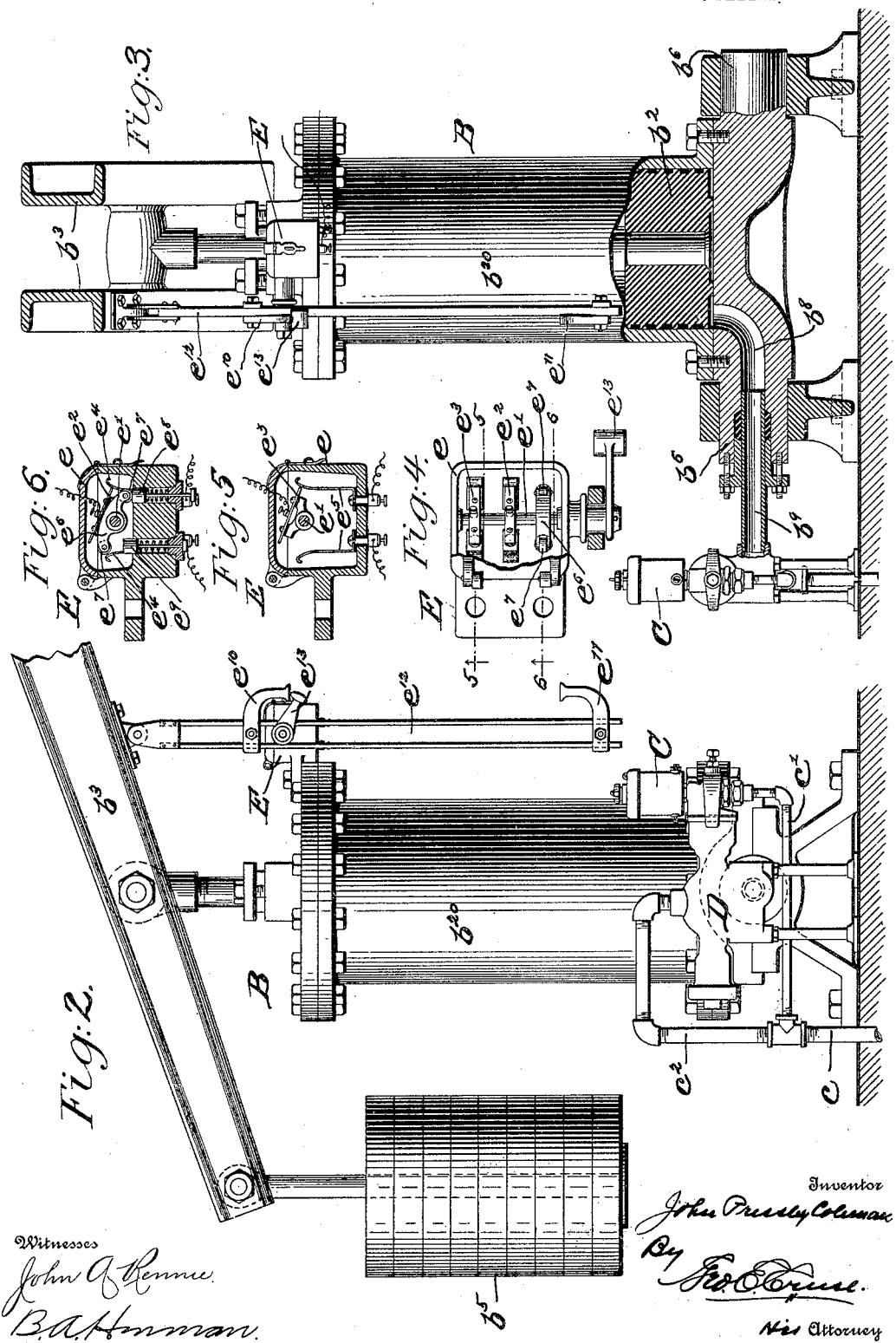

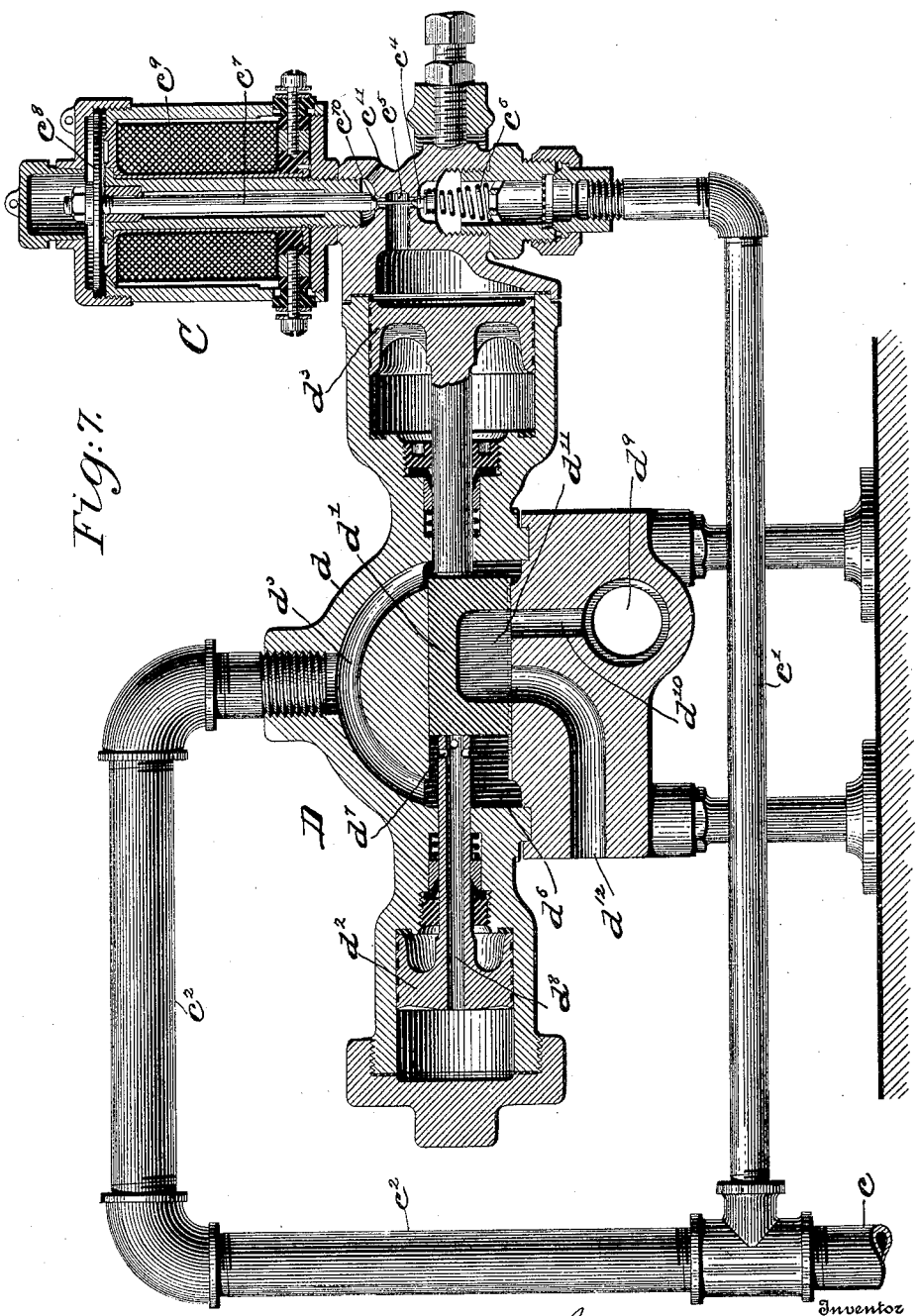

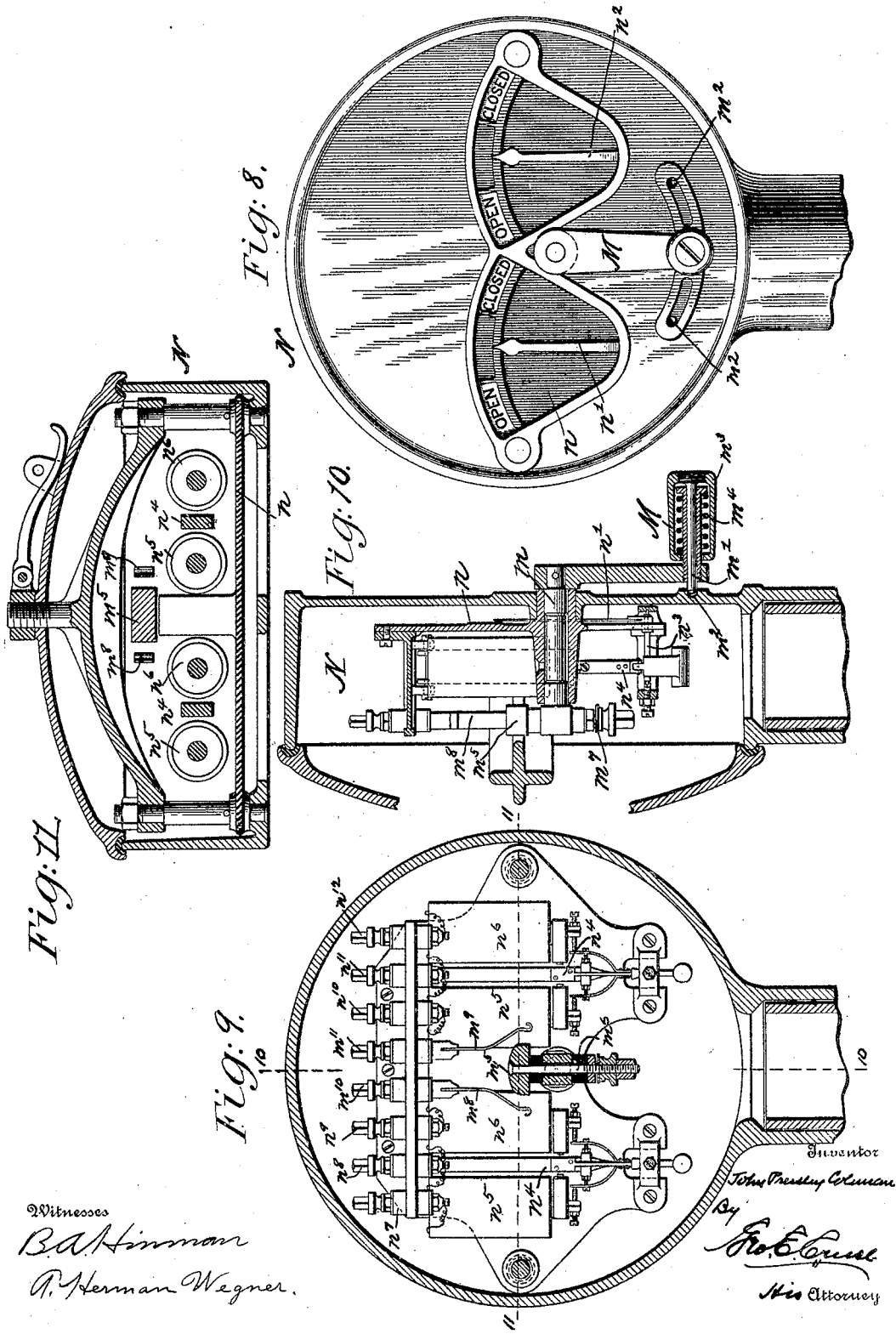

No. 802,030. PATENTED OCT. 17, 1905.
J. P. COLEMAN.
BELL OPERATING AND CONTROLLING MECHANISM FOR BLAST FURNACES.
APPLICATION FILED OCT. 8, 1903.

8 SHEETS—SHEET 5.

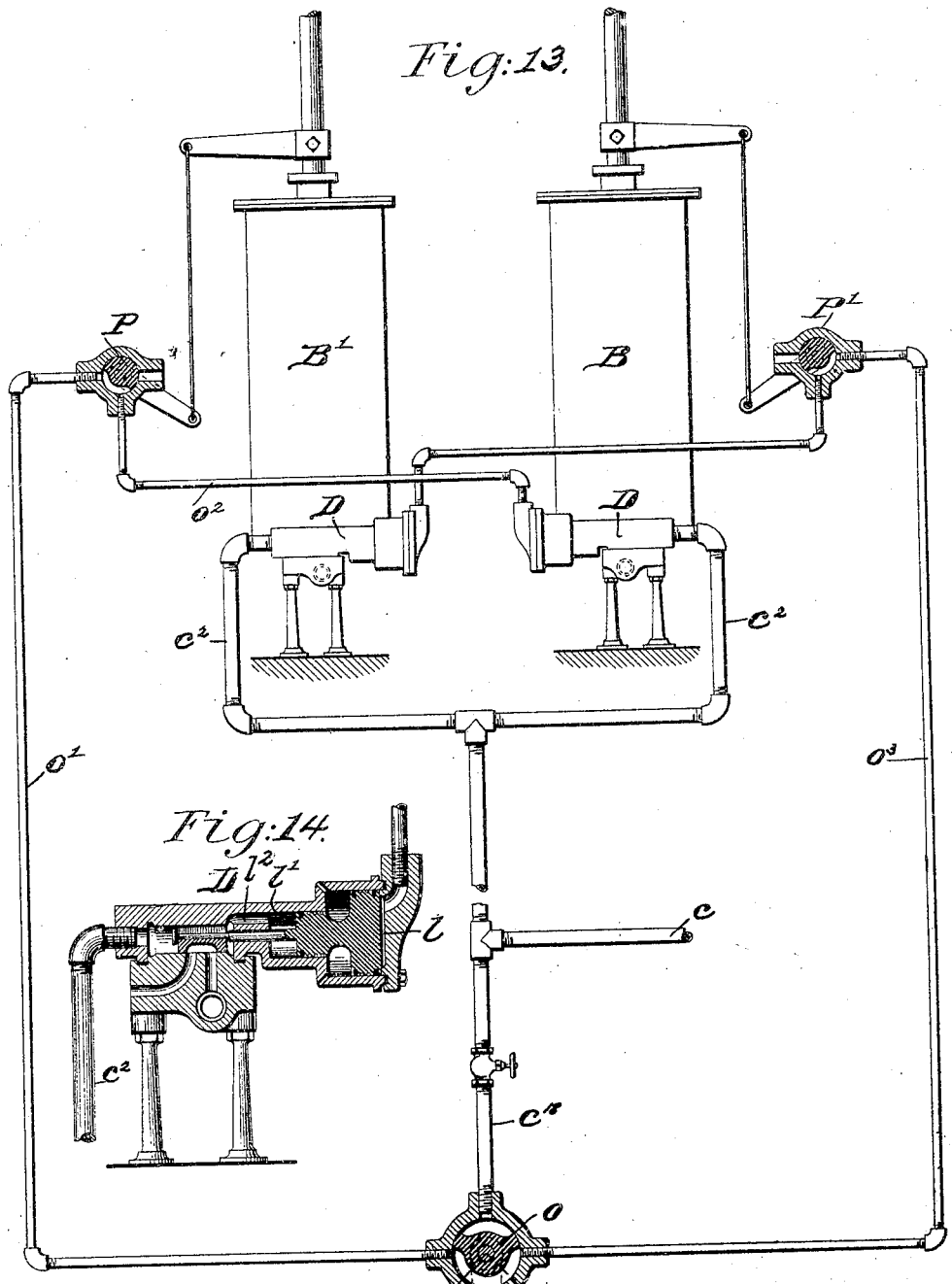

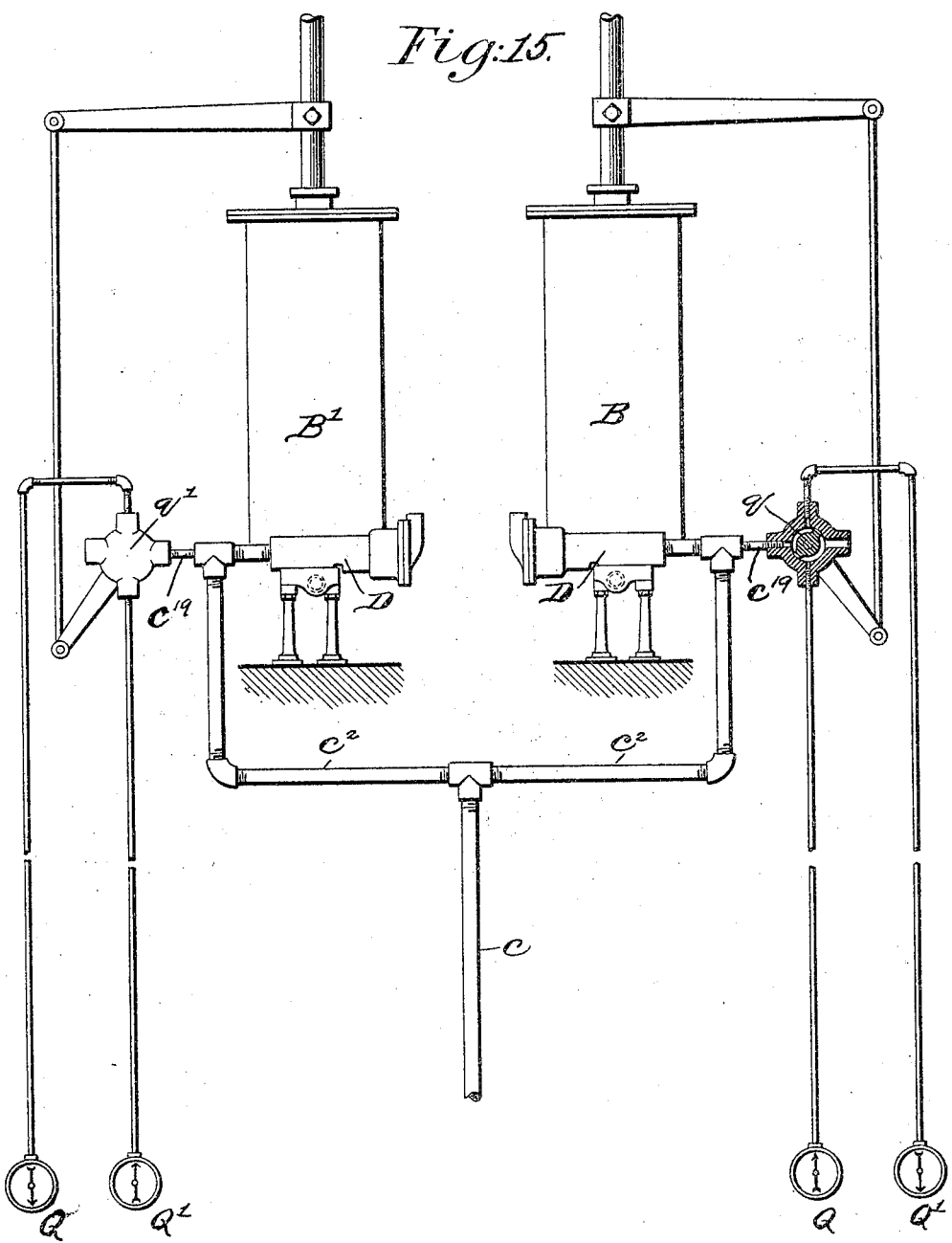

No. 802,030. PATENTED OCT. 17, 1905.
J. P. COLEMAN.
BELL OPERATING AND CONTROLLING MECHANISM FOR BLAST FURNACES.
APPLICATION FILED OCT. 8, 1903.
8 SHEETS—SHEET 8.
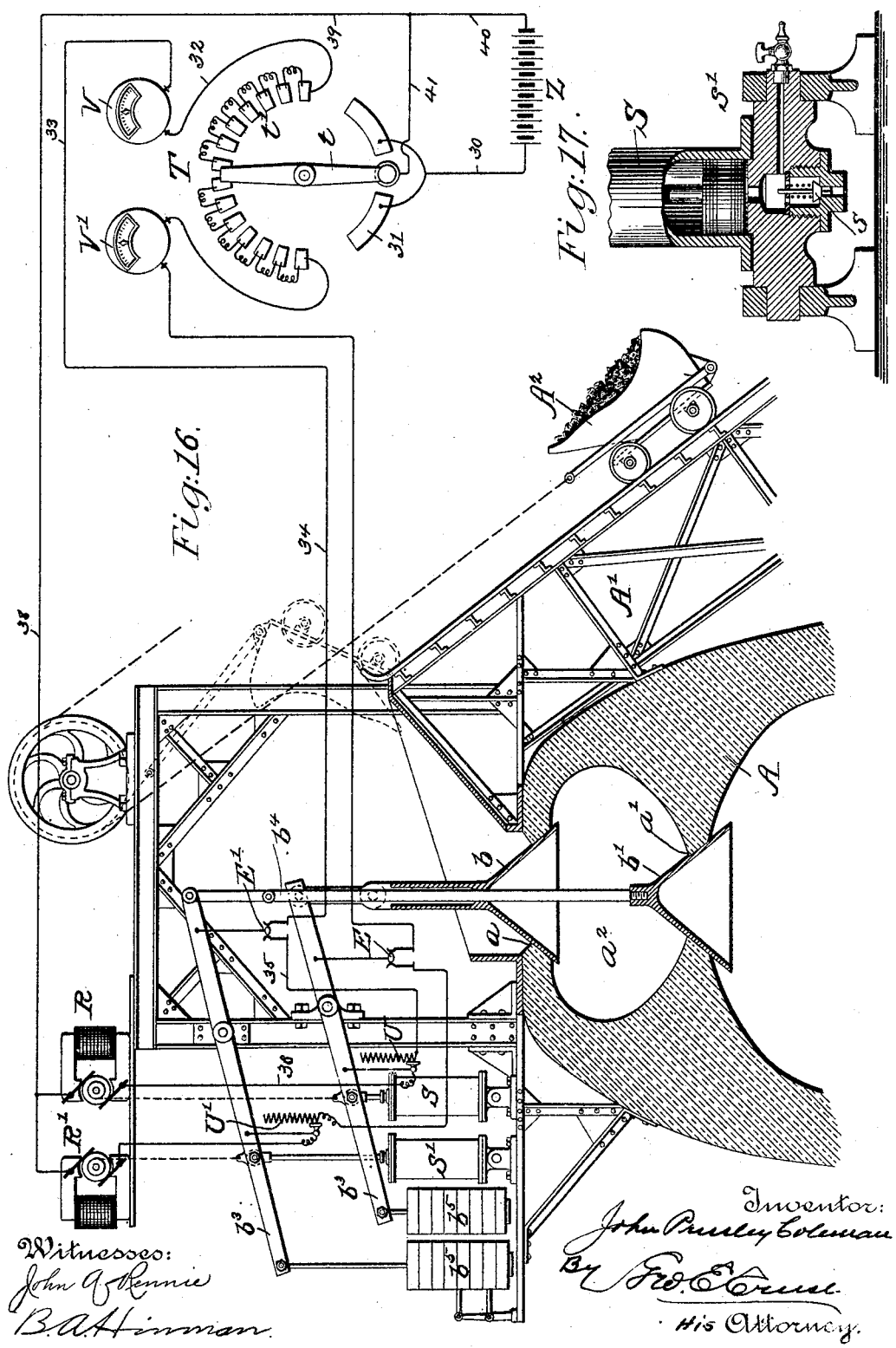

UNITED STATES PATENT OFFICE.

JOHN PRESSLEY COLEMAN, OF EDGEWOOD, PENNSYLVANIA, ASSIGNOR TO THE UNION SWITCH & SIGNAL CO., OF SWISSVALE, PENNSYLVANIA, A CORPORATION OF PENNSYLVANIA.

BELL OPERATING AND CONTROLLING MECHANISM FOR BLAST-FURNACES.

No. 802,030.     Specification of Letters Patent.     Patented Oct. 17, 1905.

Application filed October 8, 1903. Serial No. 176,283.

*To all whom it may concern:*

Be it known that I, JOHN PRESSLEY COLEMAN, a citizen of the United States, residing at Edgewood, in the county of Allegheny and State of Pennsylvania, have invented certain new and useful Improvements in Bell Operating and Controlling Mechanism for Blast-Furnaces, of which the following is a specification.

My invention relates to furnaces, and particularly to the control and to the operation of the bells or valves provided at the entrance-opening of a furnace.

My invention is designed, primarily, to prevent the opening of one of the bells by the mechanism connected with it until the other or second bell has been fully closed by the mechanism connected with the second bell, and, secondarily, to indicate to an operator the positions of the bells. I will describe a mechanism for operating and controlling the operation of the bells or valves of a furnace, together with modifications, and then point out the novel features thereof in claims.

In the accompanying drawings, Figure 1 is a view, partly in elevation and partly in vertical section, of a part of a blast-furnace, an incline leading thereto, an operating mechanism for the bells, and a control therefor, the latter embodying my invention. Fig. 2 is a detail elevational view of one of the bell-operating mechanism shown in Fig. 1 and appurtenant parts. Fig. 3 is a detail view, partly in elevation and partly in vertical section, of the bell-operating mechanism and appurtenant parts shown in Fig. 2, the view being in a plane at right angles to that of Fig. 2. Fig. 4 is a detail view, partly in top plan and partly in horizontal section, of a circuit-controller embodied in my invention. Fig. 5 is a detail vertical sectional view of the circuit-controller, the section being taken on the line 5 5 of Fig. 4. Fig. 6 is a detail vertical sectional view of the circuit-controller, the section being taken on the line 6 6 of Fig. 4. Fig. 7 is a detail view, partly in vertical section, of a controlling device for the fluid-pressure for one of the bell-operating mechanisms. Fig. 8 is a detail elevational view of an indicating device embodied in my invention. Fig. 9 is a detail view, partly in elevation and partly in vertical section, of the indicating device shown in Fig. 8, the front of the casing being removed. Fig. 10 is a detail vertical and transverse sectional view of the indicating device, the section being taken on the line 10 10 of Fig. 9. Fig. 11 is a detail horizontal sectional view of the indicating device, the section being taken on the line 11 11 of Fig. 9. Fig. 12 is a view, partly in elevation, partly in vertical section, and partly in diagram, of certain of the parts shown in Fig. 1, the diagrammatical portion being of the circuit-controller, indicating device, controller-arm, and circuits between the controller-arm, circuit-controller, and indicating device. Fig. 13 is a view, partly in elevation and partly in vertical section, showing a modification of my invention. Fig. 14 is a detail vertical sectional view of a controlling device embodied in the form shown in Fig. 13 for fluid-pressure. Fig. 15 is a view, partly in elevation and partly in vertical section, of an indicating means for the form of invention illustrated in Fig. 14. Fig. 16 is a view similar to Fig. 1, but showing a modified form of bell-operating mechanism embodying my invention. Fig. 17 is a detail view, partly in vertical section, of a cushioning device embodied in the form of invention shown in Fig. 16. Figs. 2 to 11 and Figs. 13, 14, 15, and 17 are drawn to a scale different from the scale of the remaining figures.

Similar characters of reference designate corresponding parts in all of the figures.

A designates an arbitrary representation of a portion of a furnace, and A' a portion of an incline upon which a car $A^2$, carrying the charge or charges for the furnace, travels. The car $A^2$ may be made to travel by any desired means, and the incline on which it travels, as well as the other framework and other superstructure, may be constructed and arranged in any desired manner.

$a\ a'$ designate the usual openings of the furnace through which the charge passes, and $a^2$ a chamber intermediate the openings.

$b$ designates a bell or valve for controlling the opening $a$, and $b'$ a bell or valve for controlling the opening $a'$. In the usual operation of the bells the bell $b$ is first moved to permit the charge to enter the chamber $a^2$, and after the bell $b$ is fully closed the bell $b'$ is moved to permit the charge to enter the furnace. In other words, the bells are alternately operated, and one bell should be fully or completely closed before the other bell is opened.

The operating mechanism B for the bell $b$ comprises a fluid-pressure apparatus, here shown as consisting of a cylinder $b^{20}$ and a piston $b^2$, movable therein, a lever $b^3$, with which the stem of the piston is connected, a suitable connection $b^4$ between one end of the lever $b^3$ and the bell $b$, and a weight $b^5$, which is connected with the other end of the lever $b^3$. The operating mechanism B' for the bell $b'$ comprises the same parts as the operating mechanism B, connected and operating in the same manner, so that a description of one operating mechanism will apply equally well to the other. The cylinder $b^{20}$ of each fluid-pressure apparatus is provided with trunnions $b^6$, (see Figs. 2 and 3,) which are suitably journaled in order that it may center itself with the piston's connection.

Each bell is moved from its seat in the opening to pass the charge into the furnace by the action of fluid-pressure on the piston of the fluid-pressure apparatus comprised in its operating mechanism and to its seat by the action of the weight when the supply of fluid-pressure is cut off from the fluid-pressure apparatus.

The supply of fluid-pressure, which may be any gas or liquid under pressure, to the fluid-pressure apparatus of each bell-operating mechanism is primarily under the control of an electrically-operated valve device C, having the functions of opening the supply of fluid-pressure when the magnet comprised in the device is energized, of closing or cutting off the supply of fluid-pressure when said magnet is deënergized, and of opening an exhaust port or passage through which the used fluid pressure may escape to the atmosphere. Any electrically-operated valve device having these functions may be employed.

$c$ designates a pipe or other conduit connected with a source of fluid-pressure supply, $c'$ a branch leading therefrom to the electrically-operated valve device C, and $c^2$ a branch leading to a controlling device D for the fluid-pressure supplied to a fluid-pressure apparatus.

Each controlling device D (see Fig. 7) comprises a suitable casing $d$, with which the branch pipe $c^2$ is connected, a D-valve $d'$, and pistons $d^2$ $d^3$, which shift the valve $d'$. The pistons $d^2$ and $d^3$ work in cylindrical chambers provided for them, and their stems are suitably connected with or abut against the D-valve $d'$. The area of the piston $d^3$ on which the fluid-pressure acts is at least twice that area of the piston $d^2$ on which the fluid-pressure acts, so that when fluid-pressure is admitted against the piston $d^3$ the valve $d'$ will move in response to the piston's movement, as will also the piston $d^2$. The fluid-pressure acts at all times on the piston $d^2$, it passing from the pipe $c^2$ through a passage $d^5$ in the casing $d$ into the chamber $d^6$ of the valve $d'$ and through openings $d^7$ in the hollow stem $d^8$ of the piston $d^2$. When the fluid-pressure is cut off from the piston $d^3$, the piston $d^2$, on which the fluid-pressure always acts, will move the valve $d'$ to the position shown in Fig. 7. With the valve in this position the fluid-pressure will escape from under the piston $b^2$ of the fluid-pressure apparatus through a passage $b^8$ provided in one of the trunnions $b^6$, (see Fig. 3,) through a pipe $b^9$, port $d^9$, and passage $d^{10}$ provided in the casing $d$, through the port $d^{11}$ in the valve $d'$, and passage $d^{12}$ in the casing $d$ to the atmosphere. When fluid-pressure is to be admitted under the piston $b^2$, the valve $c^4$ is moved from its seat to open the passage $c^5$ to the fluid-pressure in the pipe $c'$, which acting on the piston and being the same as the fluid-pressure in the pipe $c^2$ will move the piston $d^3$ to shift the valve $d'$, so that the fluid-pressure from the pipe $c^2$ will flow through the passages $d^5$ $d^{10}$ and port $d^9$ of the casing $d$ through the pipe $b^9$ and passage $b^8$ under the piston $b^2$. The piston will then move in its cylinder to open its bell and raise its weight $b^5$. The valve $c^4$ is moved from its seat against the action of the spring $c^6$ and the valve $c^{10}$ to its seat through a stem $c^7$, carrying a disk $c^8$ at its upper end, when the disk, which, in effect, is an armature, is attracted by the electromagnet $c^9$ when the electomagnet is energized. When the bell is to be closed, the electromagnet $c^9$ is deënergized and the valve $c^4$ moved to its seat by the spring $c^6$ to cut off the supply of fluid-pressure from the pipe $c'$ and the valve $c^{10}$ moved from its seat to permit the fluid-pressure in front of the piston escaping through a port $c^{11}$ to the atmosphere. The valve $d'$ will then be shifted by the piston $d^2$ to the position shown on Fig. 7, and the fluid-pressure will escape from under the cylinder $b^2$, as hereinbefore described, and the bell seated under the influence of the weight $b^5$.

In order that only one bell be opened at a time, I provide a circuit-controller for each bell-operating mechanism, which circuit-controller is included in the circuit of the electrically-operated valve device. The purpose of this arrangement is to prevent the operator closing the circuit on the electrically-operated valve device of the second bell-operating mechanism before the first operating mechanism has fully seated its bell.

E designates the circuit-controller, which is operated by the bell-operating mechanism B, and E' the circuit-controller, which is operated by the bell-operating mechanism B'. The circuit of the electrically-operated valve device of the bell-operating mechanism B is carried through the circuit-controller E', which is operated by the bell-operating mechanism B, and the circuit of the electrically-operated valve device C of the bell-operating mechanism B' is carried through the circuit-controller E, which is operated by the bell-operating mechanism B. Each circuit-controller includes contacts which are included in circuits for an indicating means for the position of each bell, which will be hereinafter referred to.

The circuit-controllers may be of any desired construction. I preferably employ the circuit-controller illustrated in detail in Figs. 4, 5, and 6. As the circuit-controllers are alike in construction, the description of one will apply equally well to the other. Each circuit-controller comprises a casing $e$, by which it may be suitably secured to some support—as, for example, the cylinder of its fluid-pressure apparatus—a shaft $e'$, suitably journaled in the casing, and two contact-plates $e^2 e^3$, which coact with pairs of contact-springs $e^4 e^5$, suitably secured in the casing. The circuit-controller also comprises an equalizing device, which, as shown, consists of a lever $e^6$, fast on the shaft $e'$ and carrying rollers $e^7$ at its ends, which alternately engage spring-pressed plungers $e^9$, suitably arranged in the casing $e$. The shaft $e'$ is rocked to have the rollers $e^7$ alternately engage the plungers $e^8 e^9$ through an arm $e^{13}$, which is alternately engaged by projections or arms $e^{10} e^{11}$, movable with the piston. As shown, these projections $e^{10} e^{11}$ are adjustably mounted on a downwardly-extending rod $e^{12}$, suitably secured at one end to a lever $b^3$. The action of the circuit-controller is as follows: Assuming the piston of a fluid-pressure apparatus to be at the lower end of the cylinder, as shown in Figs. 1 and 2, the projection $e^{10}$ during the downstroke of the piston engaged the arm $e^{13}$ to rock the shaft in such direction that the shaft, through the lever $e^6$, depressed the plunger $e^8$ and moved the contact-plates $e^2 e^3$ into engagement with one of the contact-springs of the pairs of contact-springs $e^4 e^5$. In this position of the contact-plates $e^2 e^3$ the circuits in which these plates and springs are included will be closed at this point. When the projection $e^{10}$ is moved away from the arm $e^{13}$, which will be when the piston moves up in its cylinder, the arm $e^{13}$ will follow the projection for a short distance under the influence of the spring-plunger $e^8$ until the arm reaches a horizontal position, where it will be held by the plungers. In the horizontal position of the arm $e^{13}$ the contact-plates $e^2 e^3$ will be out of engagement with the springs $e^4 e^5$, so that the circuits in which they are included will be open at these points. The arm $e^{13}$ will remain in this position until engaged by the projection $e^{11}$, when the arm will again be moved to rock the shaft. The shaft, however, will be rocked to have the lever $e^6$ depress the plunger $e^9$ and move the contact-plates $e^2 e^3$ into engagement with the other contact-springs of the pairs of contact-springs $e^4 e^5$. When the piston descends, the projection $e^{11}$ will move away from the arm $e^{13}$, and the arm $e^{13}$ under the influence of the spring-plunger $e^9$ will cause it to assume a horizontal position. It will be well to state here for the purpose of preventing confusion hereinafter that in the present instance only one of the contact-springs $e^5$ is employed, whereas both of the contact-springs $e^4$ are employed, and that these latter springs are included in the circuits of the indicating mechanism. Of course both springs $e^5$ could be used and only one spring $e^4$ or more or less springs. This is merely one form of circuit-controller, and any other form of circuit-controller could be used which would accomplish the results sought to be obtained by this invention.

An indicating means for indicating the position of each bell is employed. I have shown one such means in Figs. 8, 9, 10, and 11. For convenience also I have included the indicating means for each bell in the same casing and have for the same reason combined with the indicating means a controller-arm M.

N designates a casing one wall of which is provided with openings through which a suitably-marked dial or plate $n$ may be seen. The dial or plate is so marked and arranged that it will serve for both bells. Movable over the dial or plate $n$ to the different markings on the dial are pointers $n' n^2$. The pointers $n' n^2$, as shown in the drawings, are each carried on the end of a shaft $n^3$, suitably journaled in a framework provided within the casing, and also fixed on this shaft is a counterweighted armature $n^4$. Each armature works between the pole-pieces of two electromagnets $n^5 n^6$, the terminals of which are secured to binding-posts $n^7 n^8 n^9 n^{10} n^{11} n^{12}$. When the armatures $n^4$ are not attracted by either of the magnets $n^5 n^6$, it will, and with it the pointer, assume a central position through the counterweight. When attracted by one or the other of magnets, it will move the pointer to one or the other of the two indications on the dial. One binding-post in each set of three for the magnets is common to both magnets. The circuits for the pairs of magnets are closed and opened by the circuit-controllers E E', as will be hereinafter explained.

M designates a controller-arm which is fast on a shaft $m$, suitably journaled in the casing N. The lever M is provided with a latch $m'$, which fits in notches $m^2$, provided in a plate of the casing, in order that the lever may be held in the position to which it might be moved. The latch $m'$, as here shown, consists of a pin which is secured to the handle $m^3$. A spring $m^4$, inclosed by the handle, acts to keep the pin pressed into a notch $m^2$. The pin is withdrawn from a notch by a longitudinal movement of the handle, after which the lever may be moved to rock the shaft.

$m^5$ designates a contact-plate which is secured to the shaft by a bolt or pin $m^6$, the plate and bolt being suitably insulated from the shaft. The contact-plate has an electrical connection with a binding-post $m^7$, and it is adapted to be alternately moved into engagement with contact-springs $m^8$ $m^9$, electrically connected with binding-posts $m^{10}$ $m^{11}$. The contact-spring $m^8$ is included in the circuit of one of the electrically-operated valve devices C, and the contact-spring $m^9$ is included in the circuit of the other electrically-operated valve device C.

The operation of the apparatus illustrated in Figs. 1 to 11 will now be described, and reference will be had to Fig. 12, in which the certain parts are diagrammatically illustrated, especially the circuit-controllers, the indicating means, and the controller-arm. Z designates a suitable source of electrical current supply, here shown as being a battery. One pole of the battery is connected with the binding-post $m^7$, which, as has been stated, is electrically connected with the contact-plate $m^5$, movable with the lever M. The contact-spring $m^8$ is included in the circuit of the electrically-operated valve device C of the bell-operating mechanism B', and the contact-spring $m^9$ is included in the circuit of the electrically-operated valve device C of the bell-operating mechanism B. Assuming that both bells $b$ $b'$ are closed, the parts will be in the positions shown in Fig. 12. When the bell $b$ is to be opened, the controller-arm M is moved to engage the contact-spring $m^9$ to close the circuit on the electrically-operated valve device C of the bell-operating mechanism B. This circuit, starting from the battery Z, is wire 1, controller-arm M, wires 2, 3, and 4, contact-plates $e^2$ and $e^4$ of circuit-controller E', wire 5, electrically-operated valve device C, and wires 6, 7, 8, and 9 to battery Z. Fluid-pressure will then be admitted to the fluid-pressure apparatus of the bell-operating mechanism B to have it move the bell $b$ to its open position. With the bell $b$ in its closed position the circuit for the indicating means of that bell-operating mechanism is closed through the magnet $n^5$, which being energized moves the pointer $n^2$ to the point marked "closed" on the dial. This circuit, starting from the battery Z, is wires 1, 10, and 11, binding-post $n^{11}$, magnet $n^5$, binding-post $n^{10}$, wires 12, 13, and 14, contacts $e^5$ and $e^3$ of circuit-controller E, and wires 15, 16, 8, and 9 to battery. A similar circuit is also closed on the magnet $n^5$ of the indicating device for the bell-operating mechanism B', the circuit being closed through the circuit-controller E'. As the bell-operating mechanism B opens the bell $b$, its circuit-controller E is operated to break the circuit at $e^2$ $e^4$ of the electrically-operated valve device C of the bell-operating mechanism B', so that should the operator move the controller-arm to engage the contact $m^8$ the circuit of the electrically-operated valve device of the bell-operating mechanism B' would not be closed until the circuit-controller E of the bell-operating mechanism B was operated by the bell-operating mechanism on its operation to close the bell $b$. The bell-operating mechanism B in opening the bell $b$ also breaks the circuit at $e^3$ $e^5$ of the magnet $n^5$ of its indicating mechanism, and thus allows the pointer to be moved to a central position. The circuit-controller E is, however, operated by the bell-operating mechanism B when it reaches the end of its movement in opening the bell $b$ to close the circuit through the magnet $n^6$ of its indicating mechanism. This circuit, starting from the battery Z, is wires 1 and 10, binding-post $n^{11}$, magnet $n^6$, binding-post $n^{12}$, wires 17, 18, 19, and 20, contacts $e^5$ $e^3$, and wires 21, 22, 16, 8, and 9, back to battery. The pointer will then be moved to the point on the dial marked "open." When the bell $b$ is to be closed, the controller-arm M is moved from out of engagement with the contact-spring $m^9$ to break the circuit on the electrically-operated valve device C of the bell-operating mechanism B, when the parts and devices comprised in the mechanism will operate in the manner hereinbefore set forth. The circuits of the magnets $n^5$ $n^6$ will be affected to have the pointer set to the position shown in Fig. 12. The bell-operating mechanism B' may then be operated to open the bell $b'$ by moving the controller-arm M into engagement with the contact-spring $m^8$. The circuits for the valve device C and the circuit-controller E' of the bell-operating mechanism B' are substantially the same as described in connection with the same devices of the bell-operating mechanism B and may be easily traced in Fig. 12. When the bell-operating mechanism B' is opening the bell $b'$, the bell-operating mechanism B cannot operate to open the bell $b$, as the circuit of its electrically-operated valve device will be broken at $e^2$ $e^4$ in the circuit-controller E'. By this method of control and operation of the bells both bells cannot be opened at the same time, thereby accomplishing automatically which heretofore was obtained only through the intelligence of the operator, as no adequate means were provided by which the operator could ascertain the position of the bells at all times and under all conditions; nor were any means provided which would physically prevent the opening of one bell before the other bell was properly closed.

In Figs. 13 and 14 I have shown a modification of my invention. In this form fluid-pressure is employed for indication purposes, and the parts are so arranged and operated that one bell cannot be opened until the other is fully closed. The bell-operating mechanism is substantially the same. The controlling device D is modified somewhat. (See Fig. 14.) Instead of having two independent pistons I have a single piston L, having two heads $l$ $l'$ of different areas. The fluid-pressure from the pipe $c^2$ passes through a passage $l^2$ in the D-valve $d'$ and a port $l^2$ in the casing to always act on the smaller piston-surface $l'$.

Instead of an electric controller-arm M, I employ an arm O for operating a three-way cock $o$, which in one position will admit what may be termed "controlling" fluid-pressure to the operating-surface $l$ of the piston in the controlling device D of the bell-operating mechanism B and in another position will admit controlling fluid-pressure to the operating-surface $l$ of the piston in the controlling device of the bell-operating mechanism B'. Each bell-operating mechanism controls the admission of the controlling fluid-pressure to the controlling device D of the other bell-operating mechanism. As shown, this control is obtained through valves P P', provided in the pipes for the controlling fluid-pressure, and the valves are suitably connected with some movable part of the bell-operating mechanisms—as, for example, the pistons of the fluid-pressure apparatus. Referring now particularly to Fig. 13, both bell-operating mechanisms are in such position as to have both of the bells closed. To operate the bell-operating mechanism B, the controller-arm is moved to the dotted position marked $x$. Fluid-pressure will then pass from the pipe $c^{18}$ through the valve P, operated from the bell-operating mechanism B', through pipe $o^2$ to the operating-surface $l$ of the controlling device D of the bell-operating mechanism B to have it shift the D-valve to admit fluid-pressure to its fluid-pressure apparatus, as hereinbefore stated. As the piston moves upward the valve P' will be operated to prevent any controlling fluid-pressure in the pipe $o^3$ reaching the controlling device D of the bell-operating mechanism B', even should the operator move the arm to the dotted position marked $y$. When the bell $b$ is to be closed, the controller-arm O is moved to such position as to cut off the supply of fluid-pressure from the pipe $c^{18}$ and open an exhaust $o^4$ for the fluid-pressure in the pipe $o'$. Precisely the same operation takes place with the bell-operating mechanism B' when the controller-arm O is moved to the dotted position $y$.

Referring now to Fig. 15, which illustrates an indicating means for the form of apparatus shown in Fig. 14, Q Q' designate two pressure-gages, two being provided for each bell-operating mechanism. The supply of fluid-pressure for the gages is obtained from a branch pipe $c^{19}$, leading from the pipe $c^2$ or pipe $c$, in which there is always fluid-pressure, and the supply of fluid-pressure to the gages is under the control of valves $q$ $q'$, which are operated from some movable part of the bell-operating mechanism—as, for example, the piston-rod. When both bells $b$ $b'$ are closed, the valves $q$ $q'$ will be in such position as to have pressure admitted to one of the gages Q' so that the pointers on the dials will be in opposite positions. When either bell is being opened, the pointers will be in the same position, and when the bells are open the pointers of the gage Q will be down, while the pointer of the gages Q' will be up. Various changes may be made in the arrangement of parts in this form of my invention without departing from the spirit thereof. For instance, instead of a three-way valve $o$, two simple two-way valves may be employed, one in each pipe $o'$ $o^3$; but in such cases these valves are interlocked to prevent movement of both at the same time. Furthermore, the fluid-pressure in the pipes $o'$ $o^3$ may be of a different character from that employed in the fluid-pressure apparatus, and the same is true of the fluid-pressure operating the gages. When the character of fluid-pressure—such as oil, alcohol, &c.—used in these pipes differs from the other fluid-pressure, diaphragms are provided wherever desired. The use of a non-freezing or other liquid in the pipes $o'$ $o^3$ and of a gaseous fluid in the pipe $c$ and its branches would necessitate the use of the diaphragms mentioned, and economy of operation would result from this arrangement over that method employing the same fluid-pressure throughout; because no loss of fluid from the pipes $o'$ $o^3$ would then result during operation, as must be the case where an expansible fluid is used in these pipes.

In Fig. 16 I have shown another form of my invention. In this form electric motors R R' are substituted for the fluid-pressure apparatus in the bell mechanism. Cushions or buffers in the form of cylinders are employed to cushion the impact of the descending weight, and for convenience the pistons and cylinders of the fluid-pressure apparatus may be employed for this purpose.

As shown in Fig. 17, the cylinders S S' are each provided with a check-valve $s$ at its lower end, which acts in the usual manner upon the movement of the piston. An escape port or passage $s'$ is also provided for each cylinder, which port or passage may be controlled by a suitable form of valve. With the use of a cylinder to cushion the descent of the weight any desired form of starting-switch for the motors may be employed. In this form also circuit-controllers E E' are employed, and the circuits for the motors are arranged through them in precisely the same way as the circuits for the electrically-operated valve devices C, hereinbefore described.

During the descent of the weight $b^5$ the rotation of the armature is reversed. If a shunt or other circuit is closed upon the motor at such times, the reverse rotation of the armature may be controlled, and therefore the descent of the weight and the closing of the bell to a great extent by the operator. The buffer-cylinder S S' in such cases may be dispensed with. A rheostat T, embodying this feature, is preferably employed as a prime controller for bell-operating mechanism of this type in order to enable the counter electromotive force of the motor to develop before the full electromotive force of the operating-current is applied to the motor of the bell-operating mechanism. The rheostat T is preferably of such arrangement that a single rheostat may be used for both motors. In series with each part of the rheostat and each motor is a second one, U, which is suitably connected with some movable part of the bell-operating mechanism—as, for example, the lever $b^3$—which rheostats are employed to cut in resistance as the bells are opened, thus gradually and automatically lowering the current through the motor as the bells are opened and avoiding undue strains in the bell-operating parts when the bells are fully opened and held so by the torque of the motor. In closing the bells the operator shifts the arm $t$ of the rheostat to its central position, during which act the rheostat U prevents any injurious current from passing through the motor. When placed in the central position, it severs the operating-current of the battery Z from the operating-circuit of the motor and establishes a shunt upon the motor, while the motor acting as a guarantor delivers a current through the gradually-reducing resistance in the rheostat U as the bell is closed, (and the shunt of the controlling-rheostat,) which, increasing in volume as the bell is closed, constitutes a gradually-increasing load upon the generator, thus checking its speed and avoiding a violent closing of the bell. The operating-circuit for the motor R of the operating mechanism of the bell $b$, starting from the battery Z, is wire 30, contact-plate 31, arm $t$ of rheostat, through the resistance $t'$ of the rheostat T, wire 32, a double-throw ammeter V, wires 32 34, circuit-controller E', operated by the operating mechanism of bell $b'$, wire 35, rheostat U, wire 36, motor R, and wires 38, 39, and 40 to battery. As the motor R picks up its speed the arm $t$ is moved to cut out the resistances $t'$ while the rheostat U is cutting in resistance. The shunt-circuit for the motor when the arm is in its central position is the same as the operating-circuit, with the exception that the battery Z is cut out and the wire 41 cut it. The circuit for the motor R' may be easily traced from the drawings.

Instead of a shunt being closed on the motor means may be provided to automatically shift the motor-circuit to operate a magnetic or other brake. Instead of a single rheostat T two separate rheostats may be employed.

The double-throw ammeters V V' may be used as the indicating means for the position of the bells, the driving-current throwing the meter-needle to the right in one case and the generated current throwing it to the left in the other case. Instead, the indicating device described in connection with Figs. 1 to 12 may be employed.

The various devices herein shown and described are capable of many modifications, as are the controlling means specified, and the invention therefore is not to be limited to the precise methods and devices shown. Also parts of one system may be readily employed in conjunction with parts or all of another system.

What I claim as my invention is—

1. In combination with a furnace-bell, mechanism for moving the bell, an indicator for the open and closed positions of the bell, and a controller for governing the operation of the indicator, operated when the bell has assumed its open or closed position to give indication of such open and closed positions.

2. In combination with a bell-operating mechanism of a furnace, of means for indicating the open and closed positions of the bell, which means are operated through the movement of the bell only when the bell has assumed one of its positions or the other.

3. In combination with a bell-operating mechanism of a furnace, an electrically-operated device for indicating the open and closed positions of the bell, and a controller in circuit with said indicating device which is affected by the bell mechanism and operated only when the bell has assumed one of its positions or the other.

4. In combination with a bell-operating mechanism of a furnace, an electrically-operated indicating device for indicating the open and closed positions of the bell, which device is affected by a movement of the bell and operated only when it has assumed one of its positions or the other, circuits for said indicating device, and a source of current-supply therefor, and a controller operated from the bell mechanism for alternately opening and closing said circuits.

5. The combination with two operating mechanisms for two bells of a furnace, of means operable upon the movement of either of said bell-operating mechanisms for preventing the movement of one of said mechanisms during the other mechanism's operation and until the latter has closed its bell.

6. The combination with two bells of a furnace, an operating mechanism connected with each bell for moving it to an open and closed position, a controller for said operating mechanisms, and means operable by either of said operating mechanisms for preventing the operation of one mechanism while the other mechanism is moving its bell from one position to another.

7. The combination with two bells of a furnace, an operating mechanism connected with each bell for moving it to an open and closed position, an electrically-operated device for controlling the operation of each operating mechanism, and means operated from either one of said mechanisms upon its movement for breaking the circuit of the electrically-operated device of the other mechanism.

8. The combination with two bells of a furnace, an operating mechanism connected with each bell, an electrically-operated device for controlling the operation of each mechanism, and independently-arranged means operated from each mechanism for opening the circuit of the electrically-operated device of the other mechanism.

9. The combination with two bells of a furnace, an operating mechanism connected with each bell, an electrically-operated device comprised in each operating mechanism, means operated from each mechanism for opening the circuit of the electrically-operated device of the other mechanism, and an indicating device for each bell.

10. The combination with two bells for furnaces, an operating mechanism connected with each bell, an electrically-operated device comprised in each operating mechanism, means operated from each mechanism for opening the circuit of the electrically-operated device of the other mechanism, an electrically-operated indicating device for each bell, and a circuit-controller for each indicating device which is operated from each bell-operating mechanism.

11. The combination with two bells of a furnace, an operating mechanism for each bell comprising an electrically-operated device, an electrically-operated indicating device, and a circuit-controller operated from each mechanism, said circuit-controller being adapted when operated to open the circuit of the electrically-operated device comprised in the other mechanism and to open and close circuits for the indicating device of one of the bells.

12. The combination with a bell of a furnace, an operating mechanism connected therewith and comprising a fluid-pressure apparatus, an electrically-operated valve device for controlling its supply of fluid-pressure thereto, and an indicating device for said bell, which device is independent of but is affected by the movement of the bell.

13. The combination with two bells of a furnace, an operating mechanism for each bell comprising a fluid-pressure apparatus, means common to both for controlling the supply of fluid-pressure to each apparatus, and a device operated from each mechanism for effecting the controlling means of the other mechanism to prevent the controlling means opening the supply of fluid-pressure to its mechanism, which device is independent of but is affected by the movement of the bell.

14. The combination with two bells of a furnace, an operating mechanism for each bell comprising a fluid-pressure apparatus and an electrically-operated valve device for controlling the supply of fluid-pressure to the apparatus, and means operated from each mechanism for opening the circuit of the valve device of the other mechanism.

In testimony whereof I have signed my name to this specification in the presence of two subscribing witnesses.

JOHN PRESSLEY COLEMAN.

Witnesses:
W. L. McDaniel,
Geo. E. Cruse.